(12) United States Patent
Kim et al.

(10) Patent No.: US 7,909,600 B2
(45) Date of Patent: Mar. 22, 2011

(54) GATE OF DIE AND MOLD, DIE AND MOLD FOR INJECTION MOLDING, AND METHOD OF MANUFACTURING THE SAME

(75) Inventors: Jin-Gwan Kim, Seoul (KR); Tae-Seok Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 790 days.

(21) Appl. No.: 11/843,740

(22) Filed: Aug. 23, 2007

(65) Prior Publication Data

US 2008/0050465 A1   Feb. 28, 2008

(30) Foreign Application Priority Data

Aug. 23, 2006   (KR) .................. 10-2006-0079688

(51) Int. Cl.
*B29C 45/00*   (2006.01)

(52) U.S. Cl. ........ 425/567; 425/562; 425/563; 425/564; 425/556; 264/219

(58) Field of Classification Search .................. 425/567, 425/556, 562, 563, 564, 566, 572, 588; 264/219; 29/445

See application file for complete search history.

(56) References Cited

U.S. PATENT DOCUMENTS 4,961,894 A * 10/1990 Yabe et al. .................... 264/259

FOREIGN PATENT DOCUMENTS

| JP | 2002127194 | 5/2002 |
| JP | 2002337191 | 11/2002 |
| KR | 200340414 | 1/2004 |

* cited by examiner

*Primary Examiner* — Maria Veronica D Ewald
(74) *Attorney, Agent, or Firm* — Cantor Colburn LLP

(57) ABSTRACT

A die and mold for manufacturing a mold product is provided. The die and mold includes a body having a cavity that has a shape corresponding to the mold product. The body includes an upper body plate, and a lower body plate facing the upper body plate and combined with the upper body plate. The die and mold also includes a gate. The gate includes an upper gate plate, a plurality of recesses formed on a lower surface of the upper gate plate, and a lower gate plate facing the upper gate plate. A plurality of protrusions is formed on an upper surface of the lower gate plate in a location corresponding to a location in which the plurality of recesses is formed. The gate also includes a resin injection portion through which a resin is injected into the cavity.

20 Claims, 8 Drawing Sheets

GATE OF DIE AND MOLD, DIE AND MOLD FOR INJECTION MOLDING, AND METHOD OF MANUFACTURING THE SAME

This application claims priority to Korean Patent Application No. 2006-79688, filed on Aug. 23, 2006, and all the benefits accruing under 35 U.S.C. §119, the contents of which are herein incorporated by reference in their entirety.

BACKGROUND OF THE INVENTION

1. Field of the Invention

The present invention relates to a gate of a die and mold, and a die and mold for injection molding. More particularly, the present invention relates to a gate of a die and mold for manufacturing a mold product, a die and mold for manufacturing a light-guide plate used for a backlight unit through injection molding, and a method of manufacturing the same.

2. Description of the Related Art

A liquid crystal display ("LCD") apparatus is a type of flat display apparatus that has recently been in the spotlight, and is lightweight and slim rendering it useful in various fields such as mobile phones, monitors, televisions, etc.

The LCD apparatus is a light-receiving type display apparatus that displays an image using light that is externally provided to the LCD apparatus. Therefore, the LCD apparatus requires an additional backlight unit that provides the light to the LCD apparatus.

The backlight unit, in general, includes a light source, a light-guide plate diffusing the light from the light source, optical sheets diffusing or condensing the light exiting from the light-guide plate, and a reflective sheet.

The backlight unit may be classified as either a direct-illumination type or an edge-illumination type. In the direct-illumination type, the light source is disposed under the light-guide plate and emits the light to an upper direction, and the light-guide plate receives the light from the light source disposed under the light-guide plate and diffuses the light to the upper direction. In the edge-illumination type, the light source is disposed at a side portion of the light-guide plate, and the light incident from the light source passes through the light-guide plate and diffuses to an LCD panel that is disposed over the light-guide plate.

Injection molding is a method often used for manufacturing light-guide plates. Generally, the injection molding process uses a thermoplastic resin that is injected into a die and mold through an injection portion of the die and mold for the light-guide plate. Prior to injection, the thermoplastic resin is melted down and additives, such as a pigment, a resin stabilizer, a plasticizer, a filler, etc. may be included. The thermoplastic resin is filled into a cavity formed in the die and mold which forms a shape of the light-guide plate corresponding to the design of the mold. In particular, the thermoplastic resin is injected through a gate of the die and mold, which is cut and finished once the thermoplastic resin has hardened.

However, the injection molding manufacturing process causes deformation of the light guide plate due to residual stress, which in turn puts pressure on elements of the LCD device incorporating the deformed light-guide plate that are adjacent to the light-guide plate. As a result, pooling defects, white spot defects, etc., resulting from the residual stress may occur with respect to the LCD panel.

BRIEF SUMMARY OF THE INVENTION

The present invention provides a gate of a die and mold for manufacturing a mold product.

The present invention also provides a die and mold for minimizing defects caused by residual stress in a mold product manufactured by injection molding.

The present invention also provides a method of manufacturing a gate of a die and mold.

The present invention also provides a method of manufacturing a die and mold for minimizing defects caused by residual stress in a mold product.

In an exemplary embodiment, a gate of a die and mold for manufacturing a mold product includes an upper gate plate, a plurality of recesses formed on a lower surface of the upper gate plate, a lower gate plate facing the upper gate plate, and a plurality of protrusions formed on an upper surface of the lower gate plate. The plurality of protrusions is formed in a location on the lower gate plate corresponding to a location on the upper gate plate in which the plurality of recesses is formed. The upper gate plate and the lower gate plate are formed in a gate portion area of the mold product manufactured by the die and mold.

The recesses may have one of a cylindrical shape, a hemispherical shape, and a conical shape.

A horizontal cross-sectional area of each of the recesses may be decreased, as a distance from the lower surface of the upper gate plate toward an upper portion of each of the recesses is increased.

Each of the recesses may have a tapered shape.

The gate may further include a resin injection portion.

A width of the gate may be increased as a distance from the resin injection portion toward a direction of a cavity area is increased, so that the cavity area has a shape corresponding to the mold product.

The recesses may be formed at fixed distances from each other.

An exemplary die and mold for manufacturing a mold product includes a body having a cavity that has a shape corresponding to the mold product. The body includes an upper body plate and a lower body plate facing the upper body plate and is combined with the upper body plate to form the cavity. The die and mold further includes a gate. The gate includes an upper gate plate, a plurality of recesses formed on a lower surface of the upper gate plate, and a lower gate plate facing the upper gate plate. A plurality of protrusions are formed on an upper surface of the lower gate plate, in a location on the lower gate plate corresponding to a location on the upper gate plate in which the plurality of recesses is formed. The gate also includes a resin injection portion through which a resin is injected into the cavity. The upper gate plate and the lower gate plate are formed in a gate portion area of the mold product manufactured by the die and mold.

The plurality of recesses includes one of a cylindrical shape, a hemispherical shape, and a conical shape.

A horizontal cross-sectional area of each of the recesses may be decreased as a distance from the lower surface of the upper gate plate toward an upper portion of each of the recesses is increased.

A width of the gate may be increased as a distance from the resin injection portion toward a direction of the body increases.

The gate may be connected to a center region of a side portion of the body for delivering the resin injected through the resin injection portion toward the cavity of the body.

At least one of the lower surface of the upper gate plate and an upper surface of the lower gate plate includes a recess for forming a pattern on a surface of the mold product manufactured by the die and mold. The pattern may be a dot pattern.

The lower gate may include a penetration hole corresponding to the recess, and may further include an ejector pin inserted into the penetration hole.

An upper portion of the ejector pin may include a boss having one of a cylindrical shape, a hemispherical shape, and a conical shape.

An exemplary method for manufacturing a gate of a die and mold used in manufacturing a mold product includes forming a plurality of recesses on a lower surface of an upper gate plate, disposing a lower gate plate to face the upper gate plate, and forming a plurality of protrusions on an upper surface of the lower gate plate in a location on the lower gate plate corresponding to a location on the upper gate plate in which the plurality of recesses is formed. The upper gate plate and the lower gate plate are formed in a gate portion area of the mold product manufactured by the die and mold.

The recesses may have one of a cylindrical shape, a hemispherical shape, and a conical shape.

The method may also include forming a resin injection portion on the upper gate plate and the lower gate plate.

A method of manufacturing die and mold for use in manufacturing a mold product includes forming a cavity within a body of the die and mold, the cavity having a shape corresponding to a shape of the mold product, the body including an upper body plate and a lower body plate facing the upper body plate. The method also includes combining the upper body plate with the lower body plate to form the cavity, forming a plurality of recesses on a lower surface of an upper gate plate for a gate, and forming a plurality of protrusions on an upper surface of a lower gate plate for the gate. The plurality of protrusions is formed in a location on the lower gate plate corresponding to a location on the upper gate plate in which the plurality of recesses is formed. The lower gate plate is disposed to face the upper gate plate. The method also includes forming a resin injection portion on the upper and lower gate plates of the gate, and connecting the gate to a center region of a side portion of the body. A resin is injected into the resin injection portion and into the cavity.

BRIEF DESCRIPTION OF THE DRAWINGS

The above and other aspects, features, and advantages of the present invention will become more apparent by describing in detail the exemplary embodiments thereof with reference to the accompanying drawings, in which.

DETAILED DESCRIPTION OF THE INVENTION

Figure 1A:
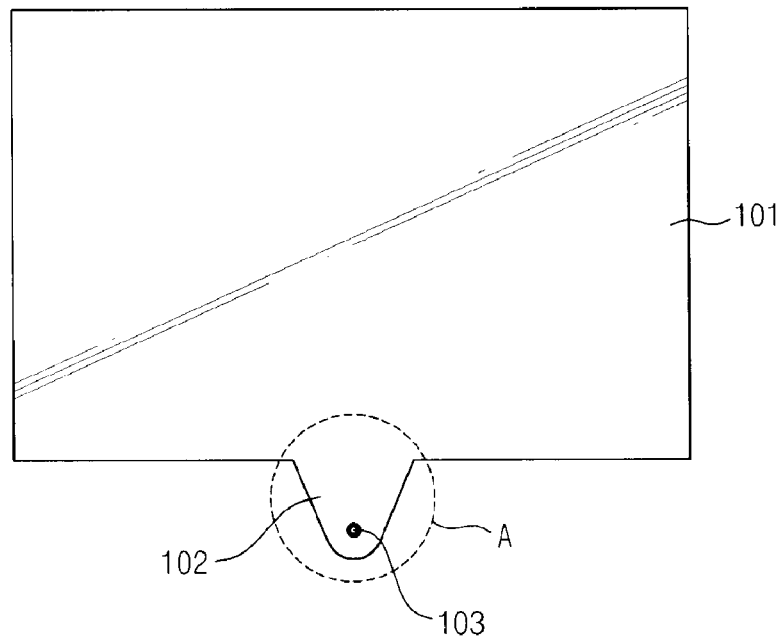
FIG. 1A is a plan view illustrating a conventional mold product manufactured by a die and mold for a light-guide plate prior to completing a finishing process.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Hereinafter, the exemplary embodiments of present invention will be explained in detail with reference to the accompanying drawings.

Figure 1B:
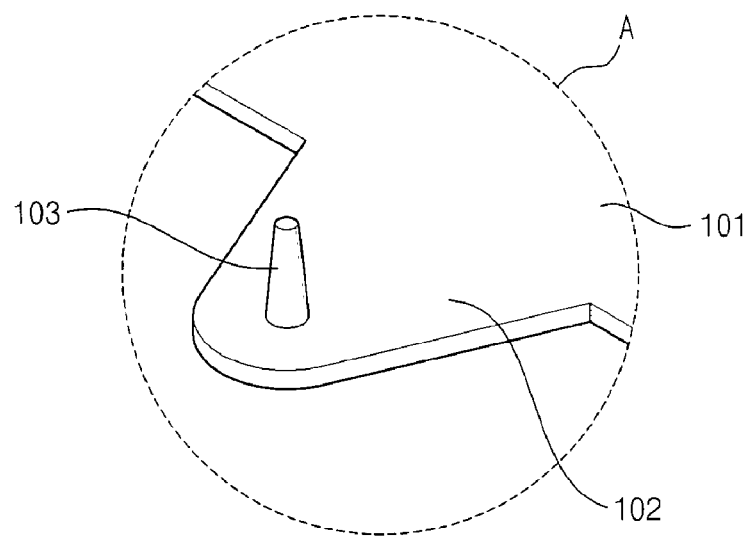
FIG. 1B is a perspective view illustrating a portion 'A' of FIG. 1A.

FIG. 1A is a plan view illustrating a conventional mold product manufactured by a die and mold for a light-guide plate prior to completing a finishing process. FIG. 1B is a perspective view illustrating a portion 'A' of FIG. 1A. The mold product is manufactured by the die and mold for a light-guide plate, and has a gate portion area 102 and a light-guide plate portion area 101.

Referring to FIGS. 1A and 1B, the mold product includes the light-guide plate portion area 101 and the gate area 102. The gate area 102 has a resin injection area 103. In FIGS. 1A and 1B, the gate area 102 has a substantially flat shape with a smooth surface.

Due to the flat shape of the gate area 102, during the injection molding process for manufacturing the light-guide plate, residual stress caused by stress from an uneven resin filling and/or from a cooling deviation may result in the finished mold product (e.g., the light-guide plate). The residual stress may cause the mold product to become deformed, particularly when the mold product is used over time and under high temperature conditions. The deformed light-guide plate may further put pressure on elements of an LCD device incorporating the deformed light-guide plate, which are adjacent to the deformed light-guide plate, such that pooling defects, white spot defects, and other flaws may result with respect to the LCD device due to, e.g., distorted alignment angles of liquid crystal molecules.

Figure 2:
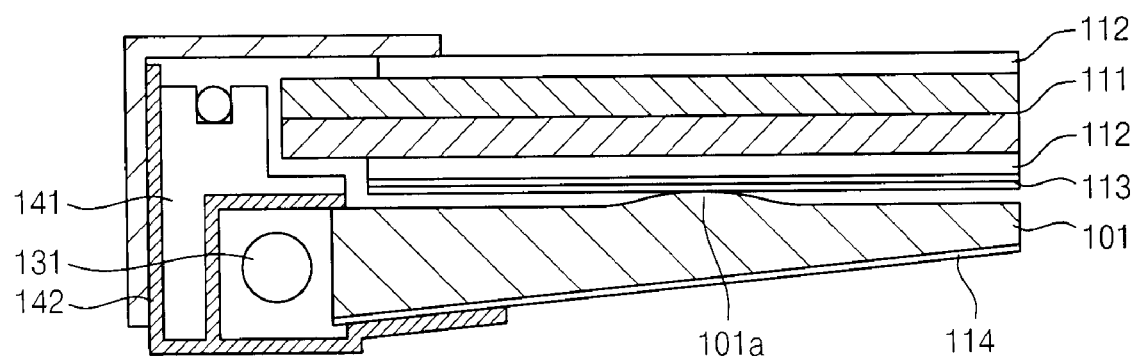
FIG. 2 is a cross-sectional view of an LCD apparatus illustrating a defect formed in a light guide plate resulting from a conventional die and mold.

FIG. 2 is a cross-sectional view illustrating an LCD apparatus including a light-guide plate manufactured using a conventional die and mold.

Referring to FIG. 2, the LCD apparatus includes an LCD panel 111 and a backlight assembly.

The LCD apparatus may further include polarizers 112 on the LCD panel 111.

The backlight assembly includes a light source 131, a light-guide plate 101, optical sheets 113, a reflecting plate 114, a mold frame 141 and a receiving container 142.

The optical sheets 113 are disposed on the light-guide plate 101, and the reflecting plate 114 is disposed under the light-guide plate 101.

The light-guide plate 101 is disposed adjacent to the light source 131. When residual stress remains in the light-guide plate 101, the light-guide plate 101 may be deformed to form a protrusion portion 101a on the light-guide plate 101.

As illustrated in FIGS. 1A to 2, a protrusion portion 101a of the light-guide plate 101 caused by the deformation puts pressure on the optical sheets 113 and the LCD panel 111, which are both disposed over the light-guide plate 101, so that defects may be caused with respect to adjacent elements thereof.

However, according to the exemplary embodiments of present invention, the residual stress is eliminated using an exemplary molding process so that the deformation of the light-guide plate 101 is prevented.

Figure 3A:
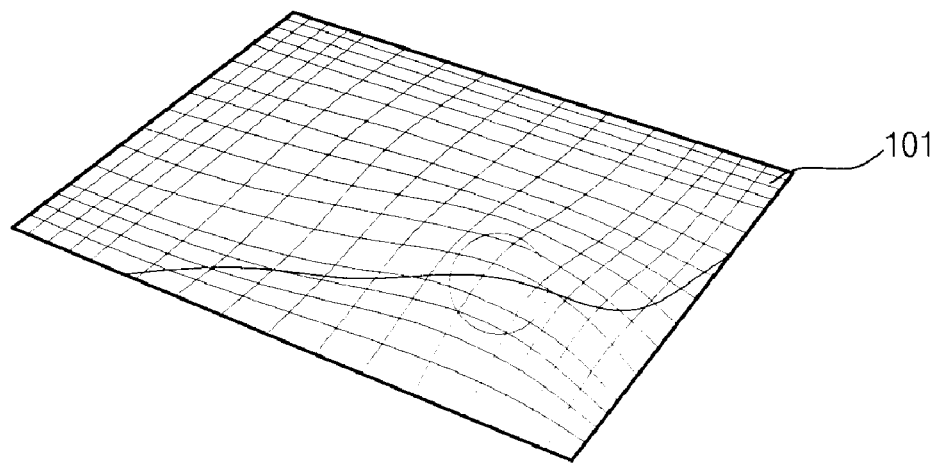
FIGS. 3A and 3B are perspective views of a light guide plate illustrating deformations caused by residual stress in the light-guide plate resulting from a conventional die and mold.
Figure 3B:
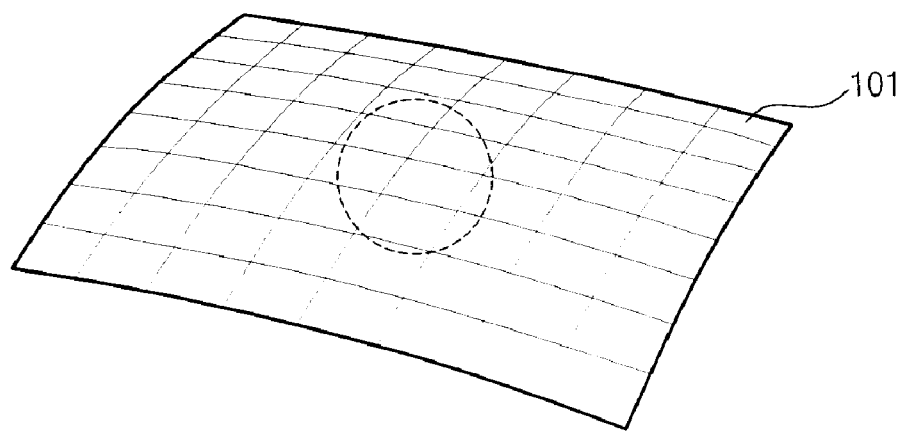

FIGS. 3A and 3B are perspective views illustrating deformations due to the residual stress in a light-guide plate manufactured using a conventional die and mold. FIG. 3A illustrates a shape of the light-guide plate 101 having a local deformation due to the residual stress, and FIG. 3B illustrates the shape of the light-guide plate 101 having an overall deformation due to the residual stress.

Figure 4A:
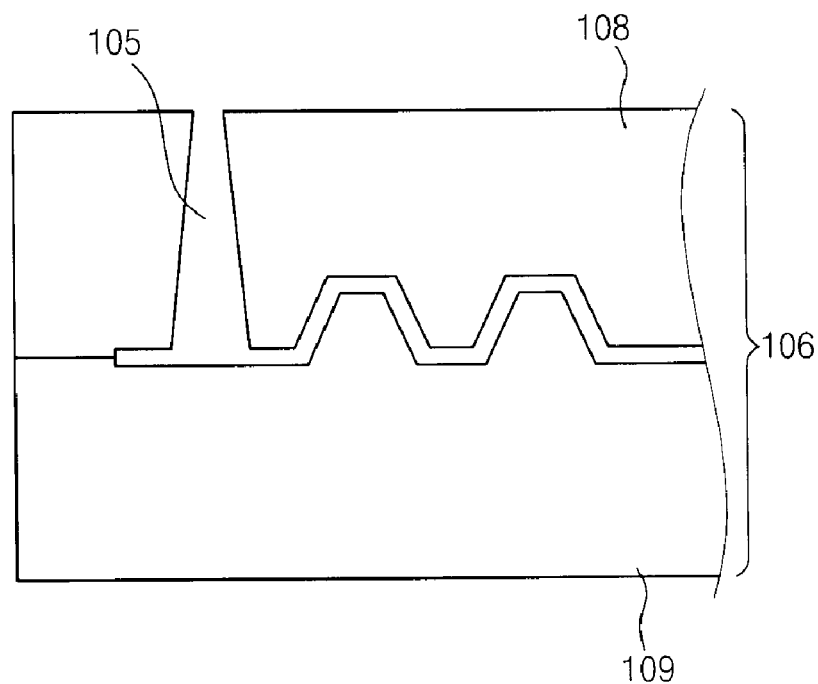
FIG. 4A is a cross-sectional view illustrating a first exemplary embodiment of a gate portion of a die and mold according to the present invention.

FIG. 4A is a cross-sectional view illustrating a first exemplary embodiment of a gate 106 portion of a die and mold according to the present invention. A resin is injected into an interior portion of the gate 106 through a resin injection portion 105. The resin passes through the gate 106 and is injected into a cavity in a body (e.g., light-guide plate product mold). As illustrated, the gate 106 includes an upper gate plate 108 and a lower gate plate 109. The lower gate plate 109 is parallel to, and faces, the upper gate plate 108. A plurality of recesses is formed on a lower surface of the upper gate plate 108 and a plurality of bosses is formed on an upper surface of the lower gate plate 109. The plurality of bosses is formed at a location corresponding to a location in which the plurality of recesses is formed.

Figure 4B:
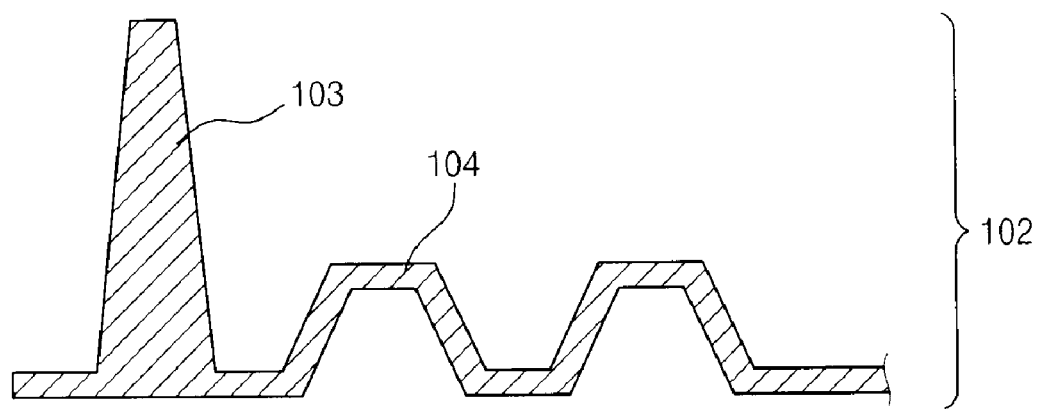
FIG. 4B is a cross-sectional view illustrating a gate area of a mold product manufactured by the die and mold shown in FIG. 4A.

FIG. 4B is a cross-sectional view illustrating a gate area 102 of a mold product manufactured by the die and mold shown in FIG. 4A (i.e., gate 106). The gate area 102 of the mold product includes a resin injection area 103 and a plurality of protrusions 104. The resin injection area 103 is formed in the mold product according to a shape of the resin injection portion 105 through which the resin is injected into the gate 106 of the die and mold. The gate area 102 includes a core portion of the mold product. The core portion is formed according to a shape of the cavity that is formed opposite to the resin injection area 103 of the mold product.

Figure 5A:
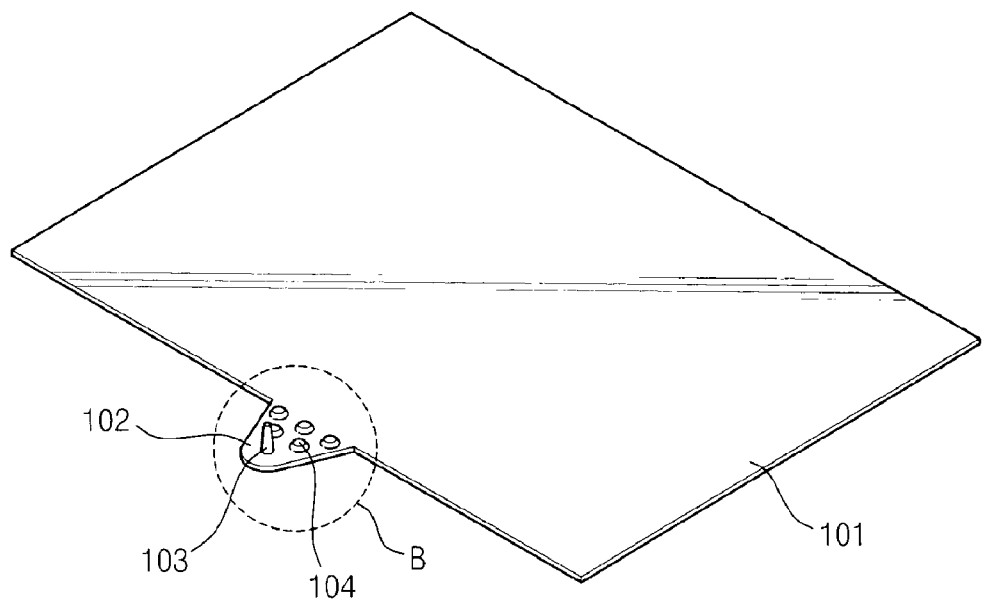
FIG. 5A is a perspective view illustrating the mold product manufactured by the die and mold shown in FIG. 4A.
Figure 5B:
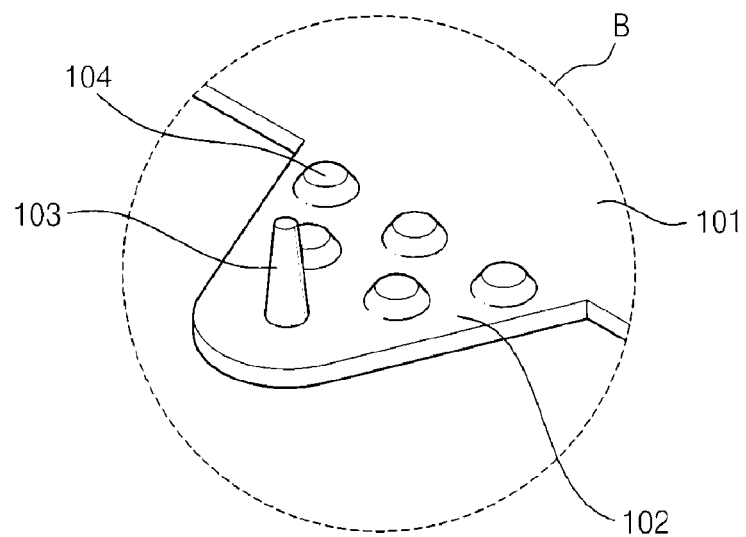
FIG. 5B is an enlarged view illustrating a portion "B" in FIG. 5A.

FIG. 5A is a perspective view illustrating the mold product manufactured using the die and mold shown in FIG. 4A, and FIG. 5B is an enlarged view illustrating a portion "B" in FIG. 5A. The protrusions 104 formed on the gate area 102 may be arranged at fixed distances from each other or may be randomly arranged. A shape of the protrusion 104 may be a cylindrical shape, a hemispherical shape or a conical shape. A horizontal cross-sectional area of the protrusions may be decreased as a distance from a lower portion of the protrusion toward an upper portion of the protrusion is increased. The protrusions 104 may have a tapered shape.

Figure 6A:
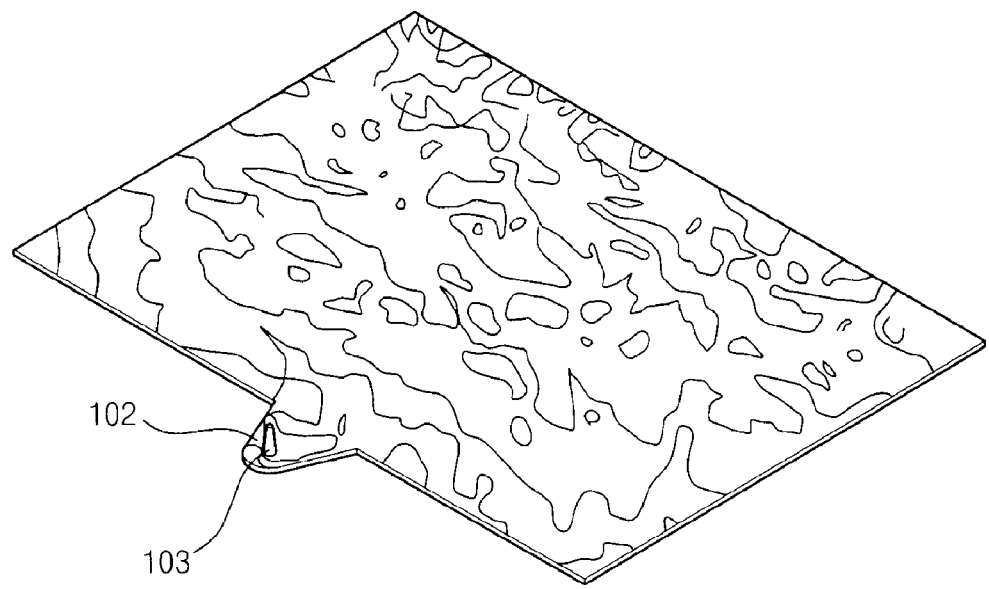
FIG. 6A is a perspective view illustrating an inlet pressure distribution of the gate area of the mold product shown in FIG. 1A.

FIG. 6A is a perspective view illustrating an inlet pressure distribution of the gate area of the mold product shown in FIG. 1A. Particularly, FIG. 6A illustrates the inlet pressure distribution of the gate area 102 in the mold product of the light-guide plate portion 101 having the flat gate area 102 with a smooth surface, which is manufactured using a conventional die and mold. As illustrated, the inlet pressure is suddenly changed in a local portion and is randomly distributed.

Figure 6B:
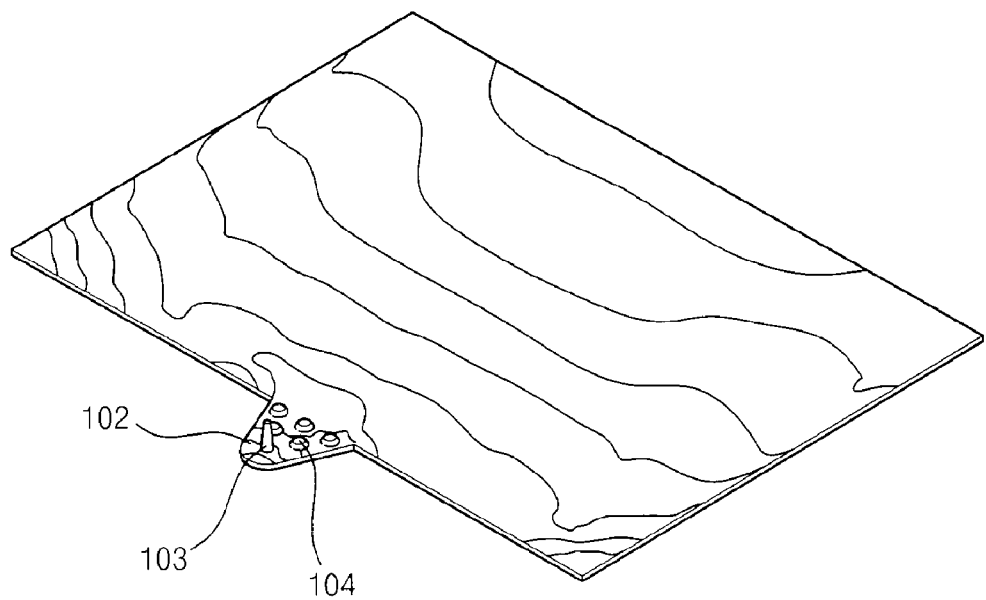
FIG. 6B is a perspective view illustrating an inlet pressure distribution of the gate area of the mold product shown in FIG. 5A.

FIG. 6B is a perspective view illustrating the inlet pressure distribution of the gate area 102 of the mold product shown in FIG. 5A. As illustrated, the inlet pressure slowly changes throughout the overall area and is uniformly distributed.

According to the exemplary embodiment of FIG. 5A, when the resin flows into the cavity formed to have the shape of the mold product, the protrusions 104 formed on the gate area 102 diffuses the resin more easily and decreases pressure applied to a direction inside the cavity area by compensating for the pressure directly applied to the cavity area through the protrusions 104, so that the inlet pressure may slowly change and is uniformly distributed.

Figure 7A:
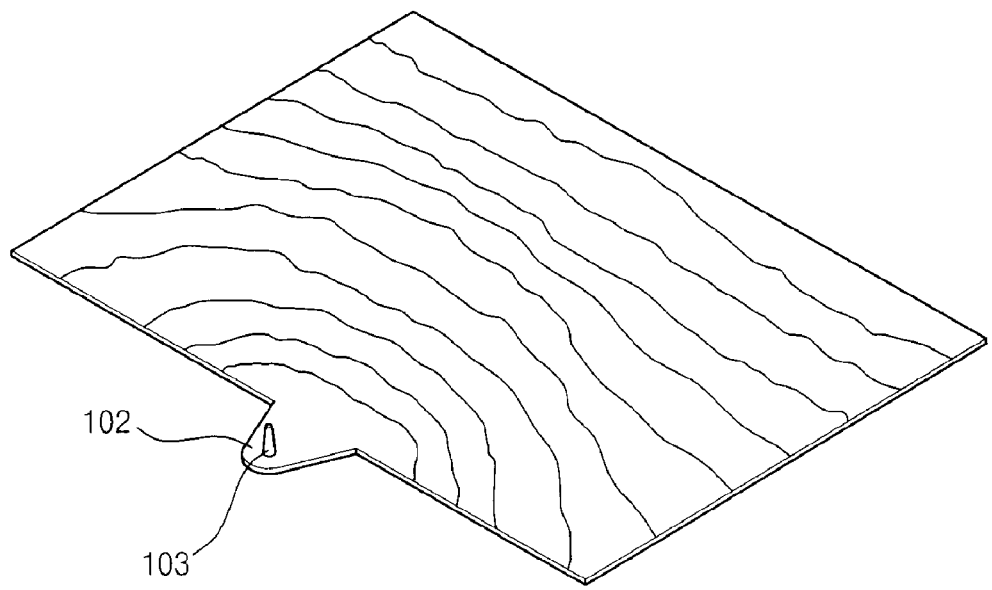
FIG. 7A is a perspective view illustrating a shear stress distribution of the gate area of the mold product shown in FIG. 1A.

FIG. 7A is a perspective view illustrating a shear stress distribution of the gate area of the mold product shown in FIG. 1A. Particularly, FIG. 7A illustrates the shear stress distribution of the gate area 102 in the mold product of the light-guide plate portion 101 having the flat gate area 102 and smooth surface, which is manufactured using the conventional die and mold. As illustrated, the shear stress is unevenly distributed around a center portion and an edge portion at which defects due to the deformation mainly occur.

Figure 7B:
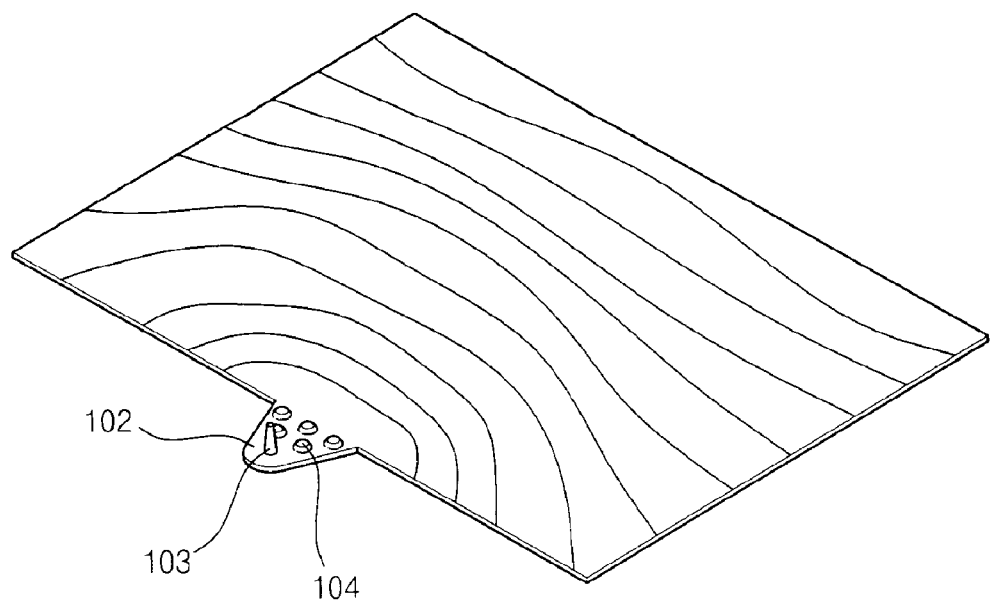
FIG. 7B is a perspective view illustrating the shear stress distribution of the gate area of the mold product shown in FIG. 5A.

FIG. 7B is a perspective view illustrating the shear stress distribution of the gate area 102 of the mold product shown in FIG. 5A. As illustrated, the shear stress slowly changes throughout the overall area and is uniformly distributed.

As illustrated in FIGS. 6A to 7B, the mold product of the light-guide plate manufactured by the die and mold for the light-guide plate according to the exemplary embodiment of FIG. 5A, has better inlet pressure distribution and shear stress distribution, so that the deformation of the light-guide plate may be prevented.

Figure 8:
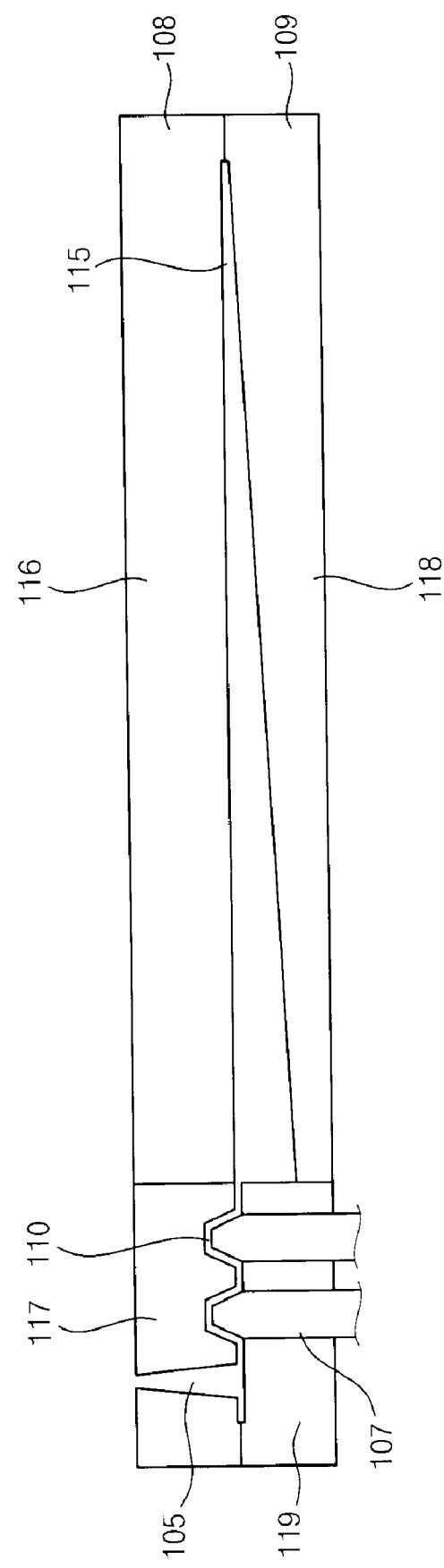
FIG. 8 is a cross-sectional view illustrating a second exemplary embodiment of a die and mold according to the present invention.

FIG. 8 is a cross-sectional view illustrating a second exemplary embodiment of a die and mold according to the present invention. The die and mold according to the present exemplary embodiment includes an upper mold plate 108, a lower mold plate 109, and a cavity 115 formed to correspond to a desired mold product in a body. The upper mold plate 108 may be divided into an upper body plate 116 and an upper gate plate 117, and the lower mold plate 109 may be divided into a lower body plate 118 and a lower gate plate 119. In one exemplary embodiment, the upper mold plate 108 may include the upper body plate 116 and the upper gate plate 117, and the lower mold plate 109 may include the lower body plate 118 and the lower gate plate 119. The die, and mold for the cavity 115 may include the upper and lower body plates 108 and 109, respectively. A resin injection portion 105 may be formed on the upper and lower gate plates, 117 and 119, respectively. A plurality of recesses 110 having an embossed shape is formed on a lower surface of the upper gate plate 117 in the upper mold plate 108.

An ejector pin 107 is formed to be inserted into a penetration hole corresponding to one of the recesses 110 formed in the lower surface of the upper gate plate 117, for separating the mold product from the die and mold. An upper portion of the ejector pin 107 includes a boss having a cylindrical shape, a hemispherical shape or a conical shape, similar to the shape of one of the recesses 110 formed in the lower surface of the upper gate plate 117. In alternate embodiments, a recess (not shown) may be formed on an upper surface of the lower body plate 118 and/or on a lower surface of the upper body plate 116 with respect to the cavity 115 in the body, for forming a pattern on a surface of the mold product manufactured by the die and mold. In addition, a recess (not shown) may be formed on the lower surface of the lower body plate 118 with respect to the cavity 115 in the body, for forming a dot pattern on a lower surface of the mold product manufactured by the die and mold.

According to the exemplary embodiments of the present invention, a die and mold having a plurality of recesses in a lower surface of an upper gate plate is manufactured, and a mold product manufactured by the die and mold has a plurality of protrusions in a gate area, so that defects due to residual stress in an injection molding process may be minimized.

Having described the exemplary embodiments of the present invention and its advantage, it is noted that various changes, substitutions and alterations can be made herein without departing from the spirit and scope of the invention as defined by appended claims.

What is claimed is:

1. A gate of a die and mold for manufacturing a mold product, comprising:
    an upper gate plate including a plurality of recesses formed on a lower surface of the upper gate plate; and
    a lower gate plate facing the upper gate plate, the lower gate plate including a plurality of protrusions formed on an upper surface of the lower gate plate, the plurality of protrusions located in regions corresponding to the plurality of recesses, and at least one of the plurality of protrusions being entirely surrounded by the corresponding recess;
wherein the upper gate plate and the lower gate plate are formed in a gate portion area of the mold product manufactured by the die and mold.

2. The gate of claim 1, wherein the recesses have one of a cylindrical shape, a hemispherical shape, and a conical shape.

3. The gate of claim 1, wherein a horizontal cross-sectional area of each of the recesses is decreased, as a distance from the lower surface of the upper gate plate toward an upper portion of each of the recesses is increased.

4. The gate of claim 1, wherein each of the recesses has a tapered shape.

5. The gate of claim 1, further comprising a resin injection portion.

6. The gate of claim 5, wherein a width of the gate is increased as a distance from the resin injection portion toward a direction of a cavity area is increased, so that the cavity area has a shape corresponding to the mold product.

7. The gate of claim 1, wherein the recesses are formed at fixed distances from each other.

8. A die and mold for manufacturing a mold product, the die and mold comprising:
    a body having a cavity that has a shape corresponding to the mold product, the body including an upper body plate and a lower body plate facing the upper body plate and combined with the upper body plate to form the cavity; and
    a gate comprising:
    an upper gate plate including a plurality of recesses formed on a lower surface of the upper gate plate;
    a lower gate plate facing the upper gate plate, the lower gate plate including a plurality of protrusions formed on an upper surface of the lower gate plate, the plurality of protrusions located in regions corresponding to the plurality of recesses, and at least one of the plurality of protrusions being entirely surrounded by the corresponding recess; and a resin injection portion through which a resin is injected into the cavity;

wherein the upper gate plate and the lower gate plate are formed in a gate portion area of the mold product manufactured by the die and mold.

9. The die and mold of claim 8, wherein the plurality of recesses includes one of a cylindrical shape, a hemispherical shape, and a conical shape.

10. The die and mold of claim 8, wherein a horizontal cross-sectional area of each of the recesses is decreased as a distance from the lower surface of the upper gate plate toward an upper portion of each of the recesses is increased.

11. The die and mold of claim 8, wherein a width of the gate increases as a distance from the resin injection portion toward a direction of the body increases.

12. The die and mold of claim 8, wherein the gate is connected to a center region of a side portion of the body, for delivering the resin injected through the resin injection portion toward the cavity of the body.

13. The die and mold of claim 8, wherein at least one of the lower surface of the upper gate plate and an upper surface of the lower gate plate, includes a recess for forming a pattern on a surface of the mold product manufactured by the die and mold.

14. The die and mold of claim 13, wherein the pattern is a dot pattern.

15. The die and mold of claim 8, wherein the lower gate plate includes a penetration hole corresponding to the recess, and further includes an ejector pin inserted into the penetration hole.

16. The die and mold of claim 15, wherein an upper portion of the ejector pin comprises a boss having one of a cylindrical shape, a hemispherical shape, and a conical shape.

17. A method for manufacturing a gate of a die and mold used in manufacturing a mold product, comprising:

forming a plurality of recesses on a lower surface of an upper gate plate;

disposing a lower gate plate to face the upper gate plate; and forming a plurality of protrusions on an upper surface of the lower gate plate, the plurality of protrusions located in regions corresponding to the plurality of recesses, and at least one of the plurality of protrusions being entirely surrounded by the corresponding recess, wherein the upper gate plate and the lower gate plate are formed in a gate portion area of the mold product manufactured by the die and mold.

18. The method of claim 17, wherein the recesses have one of a cylindrical shape, a hemispherical shape, and a conical shape.

19. The method of claim 17, further comprising:

forming a resin injection portion on the upper gate plate and the lower gate plate.

20. A method of manufacturing die and mold for use in manufacturing a mold product, the method comprising:

forming a cavity within a body of the die and mold, the cavity having a shape corresponding to a shape of the mold product, the body including an upper body plate and a lower body plate facing the upper body plate;

combining the upper body plate with the lower body plate to form the cavity;

forming a plurality of recesses on a lower surface of an upper gate plate for a gate;

forming a plurality of protrusions on an upper surface of a lower gate plate for the gate, the plurality of protrusions located in regions corresponding to the plurality of recesses, and at least one of the plurality of protrusions being entirely surrounded by the corresponding recess, wherein the lower gate plate is disposed to face the upper gate plate;

forming a resin injection portion on the upper and lower gate plates of the gate; and connecting the gate to a center region of a side portion of the body; wherein a resin is injected into the resin injection portion and into the cavity.

* * * * *